(No Model.)
H. A. HEWITT.
WRIST PLATE HOOK ROD.
No. 535,286. Patented Mar. 5, 1895.
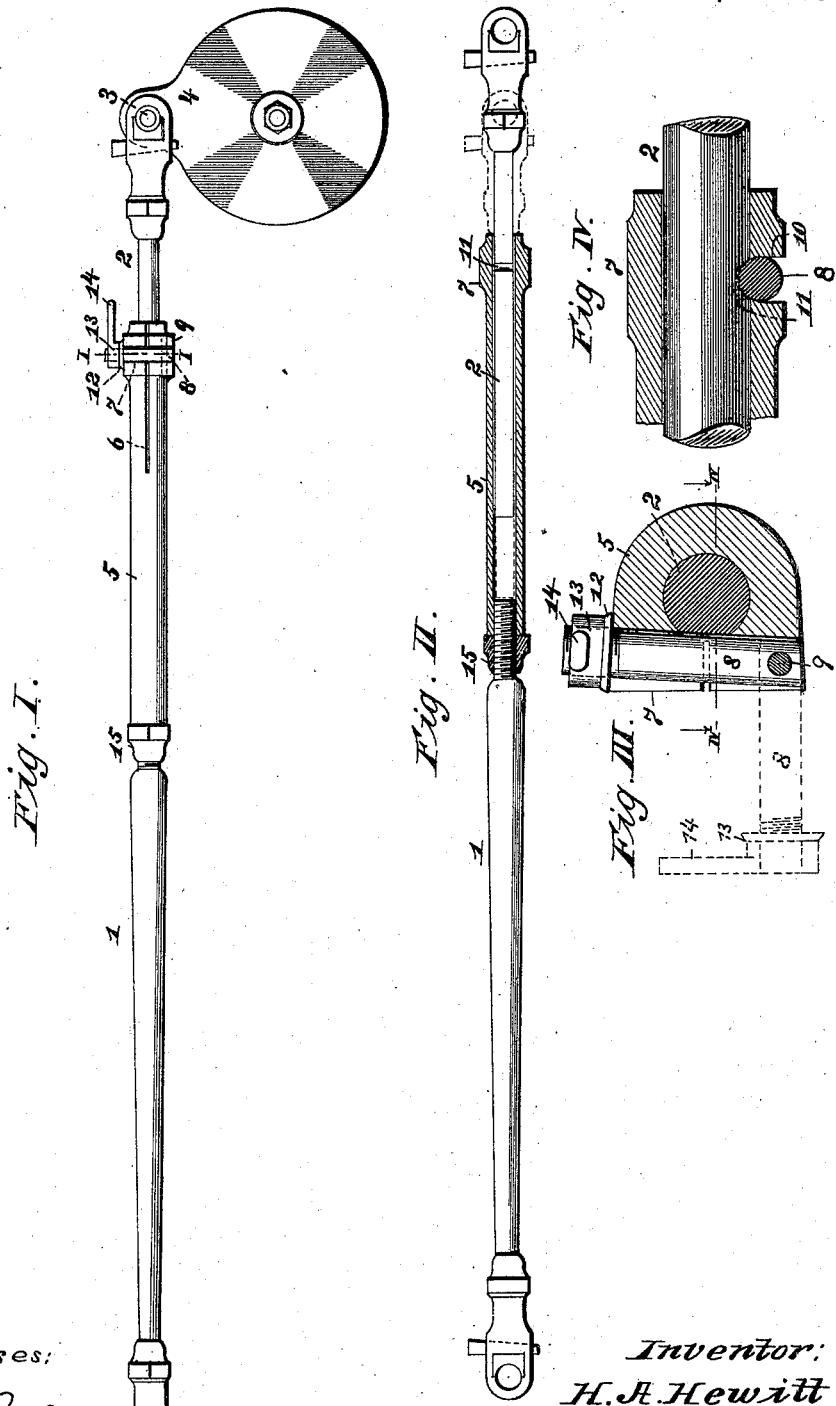
Witnesses:
F. G. Fischer
C. C. Brown
Inventor:
H. A. Hewitt
By Knight Bros
Attys.

UNITED STATES PATENT OFFICE.

HERBERT A. HEWITT, OF SIOUX CITY, IOWA.

WRIST-PLATE HOOK-ROD.

SPECIFICATION forming part of Letters Patent No. 535,286, dated March 5, 1895.

Application filed August 3, 1894. Serial No. 519,409. (No model.)

*To all whom it may concern:*

Be it known that I, HERBERT A. HEWITT, a citizen of the United States, residing at Sioux City, in the county of Woodbury, in the State of Iowa, have invented certain new and useful Improvements in Wrist-Plate Hook-Rods, of which the following is a full, clear, and exact description, reference being had to the accompanying drawings, which form a part of this specification.

My invention relates to certain new and useful improvements in wrist plate hook rods and my invention consists in certain features of novelty hereinafter described and pointed out in the claims.

Figure I is a side elevation showing a wrist plate hook rod showing my improvements thereon. Fig. II is a cross section showing my improvements. Fig. III is a cross section on the line I—I of Fig. I. Fig. IV is a cross section on the line IV—IV of Fig. III.

Similar numerals refer to similar parts throughout the several views.

I form the hook rod in sections 1 and 2, section 2 being attached on the wrist pin 3 of the wrist plate 4. Upon section 1 of the rod I thread the sleeve 5 as shown in Fig. II, forming a telescopic connection with section 2 which enters the sleeve as shown. The sleeve is formed with the slot 6 and the enlarged portion 7 at one of its ends and is provided with the pin 8 pivoted at 9 at one side of the enlarged portion, said pin being adapted to fit in the groove 10 of the sleeve and engaging the recess 11 in section 2 of the rod. The pin is provided with a washer 12 and a set nut 13 having the handle 14. When section 2 is in its place in the sleeve by tightening the nut 13 the sleeve is clamped immovably upon the rod and the strain is not on the pin but on the rod throughout.

15 is a set nut upon section 1 of the rod for adjusting and securing the sleeve in position.

This device presents the simplest and most easily operated attachment for hook rod or other connection where such appliance could be useful.

When it is desired to pump out the water or perform any other operation in which the wrist plate moves without moving the other parts of the machinery by loosening the nut 13 the pin may be thrown out of the recess in the hook rod into the position shown in dotted lines in Fig. III and section 2 of the rod is left to move freely in the sleeve thus obviating the necessity of lifting a heavy hook rod out of connection with the wrist pin, and relieving the weight which is unavoidable if a double wrist plate connection is used.

I do not limit myself to the use of the device upon a wrist plate hook rod as the same may be used upon any rod in which such telescopic connection would be beneficial.

Having thus fully described my improvements, what I claim as my invention, and desire to secure by Letters Patent, is—

1. A wrist plate hook rod formed in sections, a sleeve secured to one of the sections adapted to receive and telescope with the other section, a longitudinal slot at the telescoping end of the sleeve, a pin pivoted near said telescoping end, a groove in the sleeve to receive said pin, a recess in said telescoping section with which said pin engages and a set nut on the pin for clamping said sleeve upon said telescoping section substantially as shown and described and for the purpose set forth.

2. The combination with the rod 2 having a recess therein, and the longitudinally slotted sleeve, of the pin pivoted to the sleeve and adapted to enter the recess in the rod, and means for clamping the sleeve upon the rod substantially as set forth.

3. The combination with the rod 2 having a recess therein, and the longitudinally slotted sleeve having an enlarged portion near its end and a groove in said enlarged portion, of a pin pivoted in said groove and adapted to engage the recess in the rod, and means in connection with the pin for clamping the sleeve upon the rod substantially as set forth.

4. The combination with the sections 1 and 2 of a wrist plate hook rod, and section 2 having a recess therein, and the longitudinally slotted sleeve connected with said section 1 having an enlarged portion near its end and a groove in said enlarged portion, of a pin pivoted in said groove and adapted to engage the recess in said section 2 and a set nut on said pin adapted to engage said enlarged portion on the sleeve to clamp the sleeve on said section 2, substantially as set forth.

HERBERT A. HEWITT.

Witnesses:
W. R. VAN TENYL,
J. H. GRANGER.